United States Patent [19]
Krane

[11] Patent Number: 5,799,063
[45] Date of Patent: Aug. 25, 1998

[54] COMMUNICATION SYSTEM AND METHOD OF PROVIDING ACCESS TO PRE-RECORDED AUDIO MESSAGES VIA THE INTERNET

[75] Inventor: Leonard Krane, Los Angeles, Calif.

[73] Assignee: Talk Web Inc., Los Angeles, Calif.

[21] Appl. No.: 689,868

[22] Filed: Aug. 15, 1996

[51] Int. Cl.[6] .................................................. H04M 1/66
[52] U.S. Cl. ...................... 379/67; 379/88; 395/200.49; 707/501
[58] Field of Search .................... 379/67, 88, 89, 379/93.01, 10.01; 395/200.47, 200.48, 200.49; 704/270, 271; 707/501

[56] References Cited

U.S. PATENT DOCUMENTS

| | | | |
|---|---|---|---|
| 4,716,583 | 12/1987 | Groner et al. | 379/88 |
| 5,276,731 | 1/1994 | Arbel et al. | 379/142 |
| 5,526,353 | 6/1996 | Henley et al. | 370/471 |

OTHER PUBLICATIONS

Zue, Victor, "Navigating the Information Superhighway Using Spoken Language Interfaces", IEEE Expert, pp. 39-43 Oct. 1995.
Groner, Gabriel, "The telephone — the ultimate terminal", Telephony pp. 34-40 Jan. 4, 1984.
Web-On-Call Voice Browser Redefines Access to the Web, Press Release, http://www.netphonic.com/news/pr960304.htm Mar. 4, 1996.

*Primary Examiner*—Daniel S. Hunter
*Attorney, Agent, or Firm*—Lyon & Lyon LLP

[57] ABSTRACT

A communication system and methods for establishing pages with pre-recorded audio messages as additions to Web sites containing standard/multimedia Web pages (or alone at Web sites with no other Web pages). The pages with pre-recorded audio messages are accessible by telephone via the Internet, but not by computers accessing the Web sites via the Internet. A user can control transmission of the pre-recorded audio message to the telephone link by a voice command or by a command entered by the telephone keypad.

37 Claims, 1 Drawing Sheet

COMMUNICATION SYSTEM AND METHOD OF PROVIDING ACCESS TO PRE-RECORDED AUDIO MESSAGES VIA THE INTERNET

FIELD OF THE INVENTION

The present invention is in the field of communication systems using the Internet.

BACKGROUND OF THE INVENTION

The World Wide Web ("Web") is responsible for the largest amount of traffic movement on the Internet, surpassing all other forms of Internet traffic. There are several hundred thousand Web sites, each identified by a Domain Name, with thousands more being added each month. There are over 30 million Web pages.

Commercial Web sites have ".com" in their name, e.g. Disney® is www.disney.com., Kodak® is www.kodak.com. Organizational Web sites have ".org", e.g. Better Business Bureau is www.bbb.org; educational Web sites have ".edu", e.g. UCLA is www.ucla.edu/; governmental Web sites have ".gov", e.g. National Park Service is www.nps.gov/. Some Web sites have added letters and/or numbers in their name after ".com", etc. Many Web sites are updated frequently, making information the freshest available.

The Internet contains communication lines, Domain Name Servers ("DNS"), routers, etc. connecting Web sites residing on Web site computer servers throughout the U.S. and around the world.

When a computer user accesses the Web through an Internet Service Provider ("ISP"), e.g. America Online® or NetCom®, the user enters the Universal Resource Locator ("URL") for the Web site requested. For example, the URL for Disney® is http://www.disney.com. The URL for Kodak® is http://www.kodak.com. The computer user's Web browser (e.g. Netscape Navigator®) goes to the applicable DNS on the Internet to get the URL address, and sends an http request to the Web server at the Web site. The requested Web pages are retrieved from the Web site server and routed back over the Internet to the user's computer.

The computer user can scroll down the Web page(s) as the user reads. Highlighted words can be clicked on to hyperlink (jump quickly) to related sections of the Web page(s) or to hyperlink to a new URL which the browser will automatically retrieve from the Web. Web pages can be paused, replayed or skipped.

Standard Web pages contain text and/or pictures/graphics. Multimedia Web pages also contain audio and/or video. Specialized computer software is required to receive and playback audio, whether voice and/or music. Audio files are compressed to travel the Internet efficiently, and then decompressed at the user's computer. Different audio technologies employed by different vendors for different Web sites are not presently compatible. In addition, Web pages with audio files are slower to retrieve through the phone line to the user's computer. The practical result is that today the vast majority of Web sites do not contain audio.

Web sites are advertised in newspapers, magazines, TV and various venues such as National Basketball Association® arenas, baseball stadiums and movie theaters. Consumer products companies, car manufacturers, service companies, insurance companies, banks, TV networks, professional sports associations, employment agencies, government agencies, etc. all advertise their Web sites, which are accessible only to people using computers.

Despite the increasing prevalence of advertised Web sites, only a small percentage of the U.S. mass-market have home computers or have access to computers or know how to use a computer. For the millions of Americans who can't use a computer, the Web's growing presence in all media makes them feel "left out" and "left behind." The rich resources of the Web for information, education, research, news, shopping, opportunities, employment, etc. are denied them.

In addition, many people with poor reading skills or with vision problems who do have computer access to the Web encounter difficulties reading the text-based Web pages. When text appears on TV, whether news, sports, commercials, etc., usually the text is also read aloud. Not so on Web pages.

Accordingly, there is a need to make the Web available to people without using a computer, and to bring voice from the Web to people who can listen better than they can read.

The present invention satisfies this need by providing audio (voice, music and sound) messages located at Internet Web sites to users calling from telephones, without users needing a computer.

SUMMARY OF THE INVENTION

The present invention is generally directed to a communication system for providing telephone access to pre-recorded audio messages via the Internet through the use of a voice response unit in communication with a Web access server which retrieves a pre-recorded audio message from a Web site server containing a page with the pre-recorded audio message via the Internet.

In a first, separate aspect of the present invention, a communication system is established in which an index of pages containing a pre-recorded message is used to generate a valid access request when an access name communicated via a telephone link to the voice response unit matches an access name for an existing page containing a pre-recorded audio message. The person accessing the voice response unit can control transmission of the pre-recorded audio message to the telephone link or hyperlink to a second pre-recorded message via voice instructions or telephone keypad instructions transmitted to the voice response unit.

In a second, separate aspect of the present invention, the page which contains the pre-recorded audio message can have its own Web site or it can be part of a Web site that contains non-audio information that can be accessed by a computer. In the latter situation, access to the page with the pre-recorded audio message is limited to the Web access server in response to a valid access request so that the pre-recorded audio message will not be accessed by a computer.

In another, separate aspect of the present invention, the pre-recorded audio message is stored on a Web site server as a digital audio source file which is encoded with data packet instructions and stored in a compressed format which is then retrieved as digital data by the Web access server and subsequently decoded and decompressed before the pre-recorded audio message is transmitted to a telephone link by the voice response unit.

In still another, separate aspect of the present invention, a method for providing telephone access to a pre-recorded message is provided by storing a page with a pre-recorded audio message on a Web site server, establishing a Web access server for accessing the page via the Internet and providing a voice response unit for communicating with the Web access server and a telephone link.

In yet another, separate aspect of the present invention, telephone access is provided to pre-recorded audio messages stored on Web sites accessible by a computer link via the Internet. A pre-recorded audio message is added to an existing Web site as a digital audio source file and a link to the digital audio source file is created so that the digital audio source file can be retrieved by a Web access server through use of the unique universal resource locator and the link in response to a valid access request generated in response to communication between a telephone link and a voice response unit.

Accordingly, it is a primary object of the present invention to provide a communication system and method for providing telephone access to pre-recorded audio messages stored on a Web site server via the Internet through use of a Web access server and a voice response unit.

This and further objects and advantages will be apparent to those skilled in the art in connection with drawings and the detailed description of the preferred embodiment set forth below.

DETAILED DESCRIPTION OF THE PREFERRED EMBODIMENT

Figure 1:
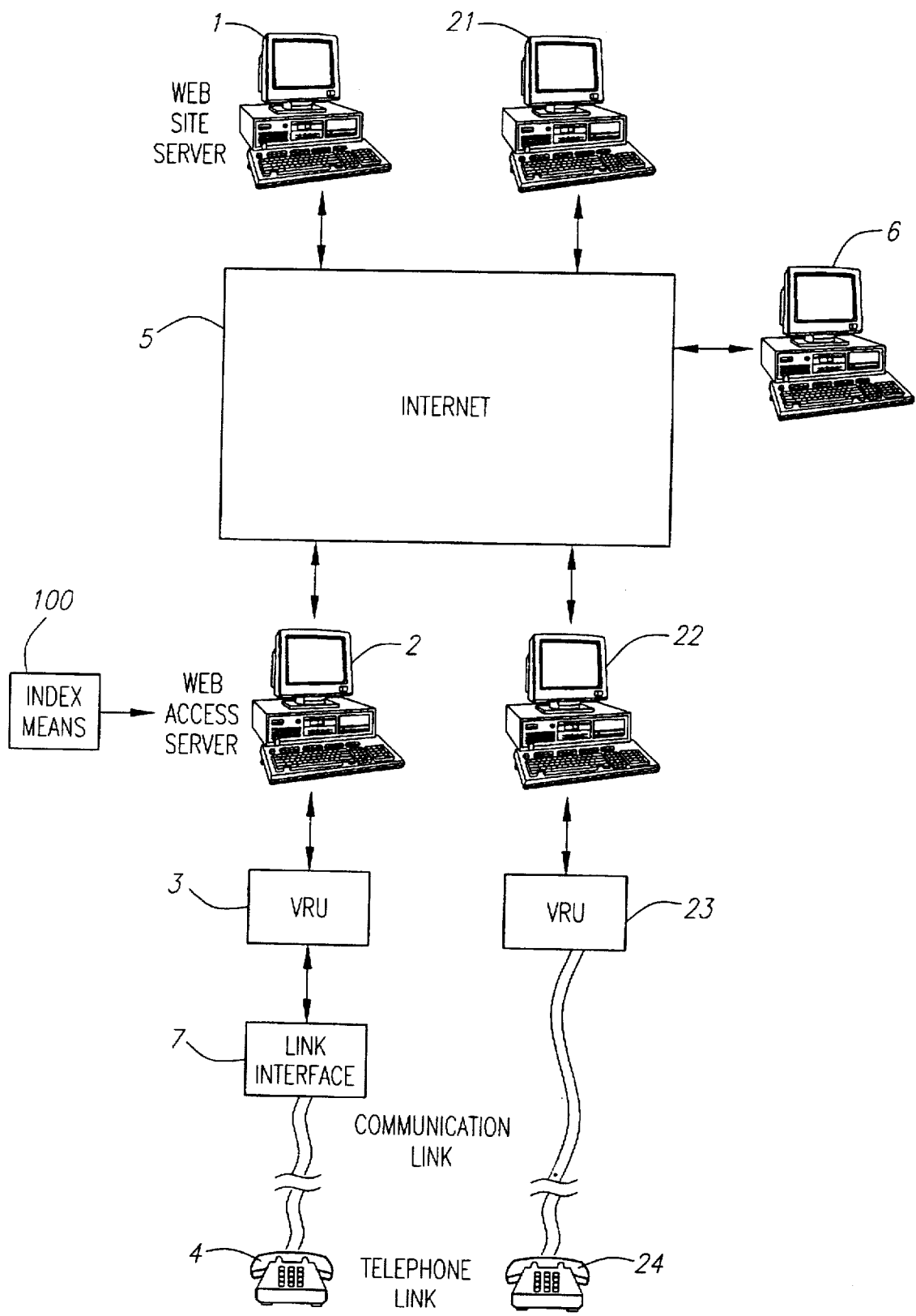
FIG. 1 is a block diagram which illustrates a communication system according to the preferred embodiment of the present invention.

As illustrated in FIG. 1, a communication system in accordance with the preferred embodiment includes a Web site server 1, a Web access server 2, a voice response unit 3 and a telephone link 4. The Web site server 1 contains a page with a pre-recorded audio message. The Web access server 2 includes communication means for accessing the Web site server 1 via the Internet 5 and for retrieving the pre-recorded audio message from the page with the pre-recorded audio message in response to an access request. The voice response unit 3 is in communication with the Web access server 2. In addition, the communication system includes interface means 7 for communicating between the telephone link 4 and the voice response unit 3 to generate the access request and for transmitting the pre-recorded audio message to the telephone link.

In the preferred embodiment of the present invention, the communication system also includes index means 100, such as a computer program stored in the Web access server 2, for comparing an access request received via the telephone link 4 with an index of pages containing a pre-recorded audio message. When the index means 100 receives a valid access request that matches an access name for an existing page containing a pre-recorded audio message, the index means 100 generates an access request which is sent to the Web site server 1 via the Internet 5 by the Web access server 2. If the index means 100 receives an invalid access request that does not match the access name for an existing page containing a pre-recorded audio message, the index means 100 generates an access denied response which is then transmitted back to the telephone link 4.

A page containing a pre-recorded audio message can be included as part of an existing Web site that contains a second page with non-audio information that can be accessed via the Internet 5 by a computer 6. The page with the pre-recorded audio message is encoded with data packet instructions and stored in a compressed format on the Web site server 1 in a digital audio source file which can be retrieved by the Web access server 2 as digital data via the Internet 5. After the digital audio source file is retrieved by the Web access server 2, it is decoded and decompressed in accordance with the data packet instructions to regenerate the pre-recorded audio message that is transmitted to the telephone link 4. The decoding and decompression is performed by software that can be located in the Web access server 2, the voice response unit 3 or a combination of the two. In order to prevent computer users from accessing the page with the pre-recorded audio message via a computer 6, access to the page containing a pre-recorded audio message can be limited to a Web access server 2 in response to a valid access request.

When a user accesses a page containing a pre-recorded audio message through the communication system of the present invention, the user can control transmission of the pre-recorded audio message to the telephone link 4 by a command signal or the user can hyperlink to a second pre-recorded audio message which may be located within the same Web site server 1 or a second Web site server 21 which is also connected to the Internet 5. In addition, a user can generate a command signal that causes the Web access server 2 to communicate with a second Web access server 22 via the Internet 5. This will allow telephone link 4 to communicate with a second telephone link 24 connected to a second voice response unit 23 via Internet 5.

To better illustrate the invention, a more detailed description will now be given of how the communication system and method of the preferred embodiment can be used to establish a system that allows users to obtain audio information via the Internet. In order to provide clarity, the communication system will be referred to as the "Talk Web" and a page of the Talk Web with a pre-recorded audio message will be referred to as a "Talk Web Page."

A Talk Web Page is created by the following steps:

1. Adding Menu, Links and Hyperlinks information to pre-recorded voice recordings which may also contain music and/or sound effects to create a combined recording.
2. Converting the combined recording to a digital audio source file, e.g. .AU or .RA or .WAV.
3. Encoding the digital audio source file to compressed format using "SoundSite", a Talk Web proprietary protocol and packet format which uses a customized version of an existing Web audio delivery system, e.g. RealAudio™, Streamworks™, ToolVox™ or TrueSpeech™.
4. Creating links to the standard/multimedia Web pages at the Web site and encoding file links, file locations, file sizes, menu selections and decompressing information using SoundSite.
5. Assembling Talk Web Pages and testing.
6. Uploading a Talk Web page to a Web site server containing enhanced Web audio server software. Same URL as for Web page.

A Talk Web page is accessed by the following steps:

1. A user calls a local Talk Web number and selects from Menu or enters the name of a Web site, e.g. Kodak.
2. The Talk Web system (Voice Response Unit ("VRU"), Web access server/index server) translates to the matching URL, e.g. http://www.kodak.com, then the Talk Web browser is sent with the URL by the Web access server over the Internet to the applicable DNS (Domain Name Server) to get the URL's Web site Internet Protocol ("IP") address.
3. Armed with the IP address, the Talk Web browser sends an http (HyperText Transfer Protocol) request to the Web site server which contains the enhanced Web audio server software.

4. The audio server software sends the requested Talk Web page(s) with the Talk Web browser which goes over the Internet back to the Web access server which contains the Talk Web Audio Player.
5. Audio Player's SoundSite decodes and decompresses each Talk Web page per data packet instructions encoded with each page.
6. The Audio Player sends audio to the VRU, and the VRU plays through the phone line to the user's telephone.

It should be noted that the Talk Web will support a Speech Recognition platform (a user enters information and requests by talking), a telephone keypad platform (a user enters information and requests by using the telephone keypad) or a combination platform (a user enters information and requests by talking when prompted to talk, and uses the telephone keypad for certain entries).

In order to become a user of Talk Web, a person calls a subscription telephone number and is prompted by the VRU to enter a credit card number and expiration date, the user's area code and phone number and a user identification number such as a driver's license number or Social Security No. (to enable Talk Web to verify their ID). The user then voice-enters their first and last name, and enters spelling of their last name. The user enters their street address and ZIP code (Talk Web index adds city and state). Talk Web obtains online phone authorization from the credit card company for the person's charge (monthly credit card billing). The user then enters a PIN (Personal ID Name/Number) name or number of their choice. The new user is then told local Talk Web phone number(s) to call to access and use the Talk Web. The user calls same number(s) to enter changes for PIN, credit card, address, etc.

Once a user has been cleared for access to the Talk Web system, the user calls a local Talk Web phone number, is prompted to enter the user's phone number and PIN, is greeted by name, e.g. "Hello Kathy Jones, welcome to Talk Web".

After greeting, a user listens and selects from the scrolling Talk Web menu, e.g. "Select a Talk Web site", "Kathy Jones' favorite Talk Web sites", "Top Ten Talk Web sites", "Headline News", "Shopping", "Clubs", "Movies", "Education", "CD Music Samples", "Sports", etc. The user makes a selection (e.g. saying "OK" with Speech Recognition platform, pressing the star key with keypad platform) which is used to generate an access request associated with the selection. To select a new Talk Web site at any time, the user enters "New" or presses the star key and then enters a site name, e.g. "Kodak" or "MCI" or "Yahoo", etc. To return to the menu at any time, the user enters "Menu" or a keypad instruction for returning to the menu.

As a user listens to a Talk Web page, the user can control transmission of the prerecorded audio message to the user with simple phone keypad entries or Voice Commands which pause, fast-forward, replay or skip the Talk Web page or sections of the Talk Web page.

As a user listens to a Talk Web page, the user can jump (hyperlink) to sections within the page(s) playing, or to another Talk Web site, by selecting topics when offered, e.g. "... to hear the newest Design Features ... say OK ..." (or "press the star key.").

A user can have favorite Talk Web sites "book-marked" by entering "Mark" while listening to Talk Web page(s) from the site. When the user selects "User's Favorite Talk Web Sites" from Menu, Talk Web checks the user's book-marked Talk Web sites to see if they've changed since the user's last visit (by, e.g., matching the last update date of the site to the date of the book-mark). This feature enables a user to access updated Talk Web sites only, without having to visit sites that haven't changed.

In the event a user forgets his or her PIN, the user can call a local Talk Web phone number, enter the user's area code and phone number, and when prompted for the user's PIN enter "ID" and the user's Driver's License No. or Social Security No. Talk Web verifies the user is a customer, resets the PIN request to default, and grants access to Talk Web.

A user can access Talk Web from any touch-tone phone (rotary-dial phone OK with Speech Recognition platform) nationally. A user away from home or office calls local 411 Information for local Talk Web number. Next, the user calls the local number, enters the user's home or office area code, phone number and PIN (Local Web access server accesses user's home or office area Web access server to verify that the user is a customer and retrieves the user's file), and then the user can begin using Talk Web.

Each Talk Web system will contain the following elements:
1. The Voice Response Unit ("VRU") is a specialized computer interface between the user's telephone and the Talk Web computer server. The VRU converts telephone keypad entries (or dialing with rotary-dial phone) and/or Voice Commands to entry on the Talk Web computer server. The VRU converts audio files (i.e. Talk Web pages) to play-back through the user's phone.
2. The Talk Web computer server ("Web access server") controls user access to Talk Web; interprets the user's selections and sends the Talk Web browser to the Internet Talk Web sites; retrieves, decompresses and plays audio files (Talk Web pages) through the VRU to the user's telephone. The Web access server also requires an index of valid Talk Web URL's to enable the Talk Web browser to access Talk Web sites. A user selection is converted to an actual URL using this index. The index can reside either in the Web access server or in a separate dedicated Talk Web computer index server.

With one local phone call, Talk Web users can visit diverse Web sites to find needed information, request brochures be mailed to them, shop using their credit cards, etc. as they surf the Talk Web. Just as computer users can do as they surf the Web.

A Web access server can be dedicated to use with Talk Web and several Web access servers can be combined to provide a Talk Web network.

Turning now to even greater detail regarding the Talk Web, the actual procedures that will take place when accessing/creating a Talk Web Page are as follows:

The Web site will use enhanced Web server software that supports Talk Web Pages as well as regular/multimedia Web pages. One method to distinguish http requests for Talk Web Pages from Web pages is: The http request, coming with an enhanced Talk Web browser to the Web site computer server ("Web site server"), will have a modifier at the end of the request packet (request message/instruction) to tell the Web server software that a Talk Web page is being requested.

The computer users of the Web site will access standard/multimedia Web pages with regular Web browsers which will not support said modifier on the http request. Therefore the Web server software will support an http request without said modifier as a request for standard/multimedia Web pages and send said pages with the Web browser to the requesting computer user.

SoundSite audio server software, also residing on the Web site server, sends the requested Talk Web page with the Talk Web browser back over the Internet. The SoundSite audio server software sends the Talk Web page in an audio stream for each http request. Depending upon the level of audio compression, a single stream of audio requires approximately 10 to 22 kb per second of audio bandwidth. Large numbers of simultaneous streams can be sent. At 10 kbps/stream, 100 streams can be sent with a T1 connection, 3,000 to 4,000 streams can be sent with a T3 connection.

Each Talk Web page will have two separate file sections:
1. The Talk Web Page control file ("the .TWC file").
2. The audio files associated with this Talk Web Page (.AU or RA or .WAV files).

SoundSite software creates the .TWC files. This proprietary software is similar to an HTML (HyperText Markup Language) development tool which actually is a set of commands (Language) for defining/programing a sequence of events to control the playing of audio files (Talk Web pages).

The .TWC file will typically contain:
A. File Header information defining the audio files:
  1. File name
  2. Date created
  3. Size in bytes
  4. Audio file types in use
  5. Total associated files
  6. Command set code
B. Program lines that instruct the decompressing and decoding software and the SoundSite Audio Player software (both residing on the Web access server) how to play the files, including hyperlinks.

An http request can be processed:
1. By first delivering the .TWC file to the Web access server. The .TWC file then requests associated audio files to be delivered based upon user requests or by default (as specified by the person creating the Talk Web pages); or
2. By delivering an entire Talk Web page to the Web access server for decompressing, decoding and playing (as specified by the person creating the Talk Web page).

Accordingly, it will be readily apparent to those skilled in the art that still further changes and modifications in the actual concepts described herein can readily be made without departing from the spirit and scope of the invention as defined by the following claims.

What is claimed is:

1. A communication system comprising:
  a Web site server containing a page with a pre-recorded audio message;
  a Web access server with communication means for accessing the Web site server via the Internet and for retrieving the pre-recorded audio message from the page in response to a valid access request;
  a voice response unit in communication with the Web access server;
  interface means for communicating between a telephone link and the voice response unit to generate an access request and for transmitting the pre-recorded audio message to the telephone link; and
  index means for comparing the access request received via the telephone link with an index of the page, wherein the index means generates the valid access request if the access request matches the index.

2. A communication system as recited in claim 1, wherein the page is part of a Web site that contains a second page with non-audio information that can be accessed via the Internet by a computer.

3. A communication system as recited in claim 2, further comprising:
  means for limiting access to the page with the pre-recorded audio message to the Web access server in response to the access request.

4. A communication system as recited in claim 1, further comprising:
  means for allowing a user accessing the page with the pre-recorded audio message to control transmission of the pre-recorded audio message to the telephone link.

5. A communication system as recited in claim 1, further comprising:
  means for allowing a user accessing the page with the pre-recorded audio message to hyperlink to a second pre-recorded audio message.

6. A communication system as recited in claim 1, wherein the pre-recorded audio message is stored by the Web site server in a digital audio source file.

7. A communication system as recited in claim 6, wherein the pre-recorded audio message is retrieved from the Web site server by the Web access server as digital data.

8. A communication system as recited in claim 7, wherein the digital audio source file stored by the Web site server is encoded with data packet instructions and stored in a compressed format.

9. A communication system as recited in claim 8, further comprising:
  means for decoding and decompressing the digital data retrieved from the Web site server by the Web access server to regenerate the pre-recorded audio message and in accordance with the data packet instructions to transmit said pre-recorded audio message to the telephone link after the digital audio source file has been retrieved from the Web site server by the Web access server.

10. A communication system as recited in claim 9, wherein the means for decoding and decompressing the digital data retrieved from the Web site server by the Web access server is located in the Web access server.

11. A communication system as recited in claim 1, further comprising means for allowing the telephone link to generate a control signal which causes the Web access server to communicate with a second Web access server via the Internet.

12. A communication system as recited in claim 11, further comprising a second voice response unit in communication with the second Web access server.

13. A communication system as recited in claim 1, wherein the index means generates an access denied response if the incoming access request does not match the access name for the existing page containing a pre-recorded audio message.

14. A communication system as recited in claim 1, wherein the access request is generated from a signal originated from a telephone keypad.

15. A communication system as recited in claim 1, wherein the access request is generated from a voice.

16. A communication system as recited in claim 1, wherein the valid access request is generated only in response to a signal from a telephone keypad or a voice.

17. A method for providing telephone access to a pre-recorded audio message via the Internet, the method comprising the steps of:
  storing a page with a pre-recorded audio message on a Web site server that is accessible via the Internet;
  establishing a Web access server with communication means for accessing the page via the Internet and for retrieving the pre-recorded audio message from the page via the Internet in response to a valid access request;

providing a voice response unit in communication with the Web access server which is accessible by a telephone link;

providing interface means for communicating between the telephone link and the voice response unit to generate an access request and for transmitting the pre-recorded audio message to the telephone link;

comparing the access request with an index of the page; and generating the valid access request if the access request matches the index.

18. A method as recited in claim 17, further comprising:

allowing a user accessing the page with the pre-recorded audio message to control transmission of the pre-recorded audio message to the telephone link.

19. A method as recited in claim 17, further comprising the step of generating an access denied response if the incoming access request does not match the access name for the existing page containing a pre-recorded audio message.

20. A method as recited in claim 17, wherein the access request is generated from a signal originated from a telephone keypad.

21. A method as recited in claim 17, wherein the access request is generated from a voice.

22. A method as recited in claim 17, wherein the valid access request is generated only in response to a signal from a telephone keypad or a voice.

23. A method for accessing a pre-recorded audio message via the Internet, comprising:

converting the pre-recorded audio message to a digital audio source file;

adding the digital audio source file to an existing Web site that contains non-audio information that can be accessed via the Internet;

creating a link to the digital audio source file at the existing Web site;

receiving an access request via a voice response unit in communication with a telephone link;

comparing the access request with an index to the link to the digital audio source file;

retrieving the digital audio source file via the Internet if the access request matches the index;

converting the digital audio source file into an audio file; and transmitting the audio file to the telephone link.

24. A method as recited in claim 23, wherein additional audio information is added to the pre-recorded audio message to create a combined recording which is converted to the digital audio source file.

25. A method as recited in claim 23, wherein the pre-recorded audio message is encoded to a compressed format.

26. A method as recited in claim 24 wherein the combined recording is encoded to a compressed format.

27. A method as recited in claim 23, wherein the voice response unit decompresses the digital audio source file.

28. A method as recited in claim 23, wherein the Web access server decompresses the digital audio source file.

29. A method as recited in claim 23, wherein the transmission of the audio file to the telephone link can be controlled by the telephone link.

30. A method as recited in claim 23, wherein a non-audio control file is added to the pre-recorded audio message and then converted to the digital audio source file.

31. A method as recited in claim 30, wherein the non-audio control file is used to control transmission of the audio file to the telephone link.

32. A method as recited in claim 30, wherein the non-audio control file is used to allow a user accessing the digital audio source file to hyperlink to a second pre-recorded audio message.

33. A method as recited in claim 23, wherein the access request is generated from a signal originated from a telephone keypad.

34. A method as recited in claim 23, wherein the access request is generated from a voice.

35. A method as recited in claim 23, wherein the valid access request is generated only in response to a signal from a telephone keypad or a voice.

36. A communication system for providing telephone access to pre-recorded audio messages via the Internet, comprising:

a Web site server containing a page with a pre-recorded audio message;

a Web access server with communication means for accessing the Web site server via the Internet and for retrieving the pre-recorded audio message from the page in response to an access request;

a voice response unit in communication with the Web access server;

interface means for communicating between a telephone link and the voice response unit to generate the access request and for transmitting the pre-recorded audio message to the telephone link; and index means for comparing an access request received via the telephone link with an index of pages containing a pre-recorded audio message, wherein the index means either generates the access request in response to a valid access request that matches an access name for an existing page containing a pre-recorded audio message or generates an access denied response in response to an invalid access request that does not match the access name for the existing page containing a pre-recorded audio message.

37. A method for providing telephone access to a pre-recorded audio message via the Internet, comprising:

storing a page with a pre-recorded audio message on a Web site server that is accessible via the Internet;

establishing a Web access server with communication means for accessing the page via the Internet and for retrieving the pre-recorded audio message from the page via the Internet in response to a valid access request;

providing a voice response unit in communication with the Web access server which is accessible by a telephone link with interface means for communicating between the telephone link and the voice response unit to generate the access request and for transmitting the pre-recorded audio message to the telephone link; and comparing an access request received via the telephone link with an index of access names for a plurality of pages which contain pre-recorded audio messages to determine if the access request matches an access name of the index and generating the valid access request only if the access request matches one of the access names of the index.

* * * * *